Oct. 22, 1968 E. N. CLARK ET AL 3,407,355

DATA PROCESSING AND SIGNAL DISPLAY SYSTEM FOR RADIO COMMUNICATION SOUNDING SYSTEM

Filed Nov. 16, 1964

2 Sheets-Sheet 1

INVENTORS
EUGENE N. CLARK
VIRGIL D. CONE
DALE P. MASHER
WILBUR R. VINCENT
BY Samuel Lindenberg
Abraham Wasserman
ATTORNEYS INVENTORS
EUGENE N. CLARK
VIRGIL D. CONE
DALE P. MASHER
WILBUR R. VINCENT
BY Samuel Lindenberg
Abraham Wasserman
ATTORNEYS United States Patent Office 3,407,355

Patented Oct. 22, 1968

3,407,355

DATA PROCESSING AND SIGNAL DISPLAY SYSTEM FOR RADIO COMMUNICATION SOUNDING SYSTEM

Eugene N. Clark, San Mateo, Virgil D. Cone, Palo Alto, and Dale P. Masher and Wilbur R. Vincent, Los Altos, Calif., assignors to Stanford Research Institute, Menlo Park, Calif., a corporation of California Filed Nov. 16, 1964, Ser. No. 411,383
18 Claims. (Cl. 325—67)

ABSTRACT OF THE DISCLOSURE

In a sounder receiver an arrangement for recording amplitude and/or distortion characteristics of an input signal received in the form of a succession of input samples. Noise samples are received prior to the input samples. Thereafter, the noise samples are utilized to generate a controllable threshold noise signal. The input samples are examined to select the sample with the largest amplitude. In one part of the arrangement, the amplitude of the largest sample is compared with the noise signal and a first output signal is provided which represents the number of increment signals to be added to the noise signal to exceed the amplitude of the largest sample. The first output is printed out as a number. The noise signal and the input samples are also used to determine whether a preselected interval after the detection of the first input sample whose amplitude exceeds the noise signal, the amplitude of another of the input samples exceeds the noise signal. If it does not, the number is printed out in black. If however one of the input samples exceeds the noise level after such interval, it represents input signal distortion and the number is printed out in red.

The present invention relates to radio communications systems and, more particularly, to an improved system for displaying data derived from sounding systems used in radio communication analysis.

The ionosphere is often used to reflect or bend radio signals which are transmitted from a transmitter to a receiving station. Conidtions of the ionosphere change continuously as a result of the changing relationship between the ionosphere and the sun. Consequently, the optimum frequency of the radio signals which should be used in order to obtain satisfactory communication results varies during each day, as well as the season of the year. Therefore, systems have been developed to determine periodically such optimum frequency.

Generally, in such a system known as a sounder system, a transmitter radiates a series of radio signals, each signal being transmitted at a different frequency. The signals are received by a sounder receiver. They are then analyzed on the basis of various characteristics thereof, such as for example, their amplitudes and time delays or distortion. On the basis of such analysis, the optimum frequency to be used in communicating between any particular stations during a particular time is determined. One such system, for example, is at present commercially available, from Granger Associates of Palo Alto, California.

The conventional presentation of the signals received by presently known sounder systems is on a storage tube display unit, which generally comprises an electrostatic storage type cathode ray tube. The tube provides a visual display of ionospheric parameters in the form an ionogram. The horizontal axis of the display indicates the different frequencies of the received signals and relative time delay in milliseconds of each received signal is displayed along the vertical axis of the display. Since the signals transmitted are normally a known number of milliseconds in width, reception of vertical traces in excess of a given number of milliseconds indicates distortion of the received signal, which implies that difficulty will be encountered with communication if the particular frequency in question were used. The intensity of the beam of the cathode ray tube is modulated as a function of the amplitude of the received signals, which must be greater than the threshold level of the tube before a visible record is produced on the display surface thereof.

Such a display system, though providing useful data, can only be operated by highly trained personnel who must be on hand to interpret and transcribe the information from the face of the display tube. Another basic disadvantage of using the storage tube display method is the limited dynamic range thereof. The dynamic range of the storage tube display is possibly seven or eight decibels (db), whereas, the dynamic range of the signals received by the sounder receiver can easily exceed 70 db. Thus, much of the information produced by the sounder receiver is lost when the storage tube display method is used. Another basic disadvantage of the use of storage tube for displaying the ionograms is the short life of each ionogram on the face of the tube, which generally is less than one minute. Therefore, in order to provide permanent records for use in future analysis, a camera must be attached to the tube to photograph each ionogram displayed thereon. However, the use of a camera has been found to be quite limited. This is due to the delay in using up a reasonable film length before the film is actually processed. Thus, the availability of a permanent ionogram is detailed. But, in practice, the major interest in the ionogram is mostly concentrated within a short period commencing immediately after reception of the signals. This is due to the basic purpose of the ionogram which is to derive the optimum frequency as close as possible to the time of actual radio communication. Therefore, a camera with a reasonable film length is economically unpractical.

Accordingly, it is an object of the present invention to provide an improved display of data received by sounder receivers.

Another object of the present invention is the provision of an improved data display for sounder receivers which does not require manual operation.

Still another object of the present invention is an automatic display system wherein the time delay, as well as the relative amplitudes of all the signals are representable in a typewritten permanent record, within a very short period after receiving the signals.

A further object of the present invention is the provision of a display system wherein the characteristics of the received signals are automatically displayed in a chart form which is similar to conventional prediction charts used in determining optimum frequencies for radio communication.

These and other objects of the invention are achieved by displaying in a chart form data derived in a specialized computing system which is supplied with the basic data received by a conventional sounder receiver. Each signal transmitted at a given frequency by the sounder transmitter is generally sampled by the sounder receiver at a predetermined rate for a given period so as to provide a known number of samples for each received signal. These samples together with noise data are temporarily stored in the specialized computing system of the present invention. Once each group of samples of a particular signal are stored, the data is analyzed to provide a noise threshold level with which each of the samples of the actual signal is compared. The comparing operation provides a relative measure of the maximum amplitude of any of the samples of the particular signal.

In addition, each sample is compared with the noise threshold level to determine the distortion characteristics of the particular signal. At the end of the computational cycle, for each group of samples of a particular signal which has been transmitted at a particular frequency, the maximum relative amplitude of the greatest sample is presented in the form of the magnitude of a number which is typed out in chart form. The color of the printed number indicates any distortion which may be present in the received signal.

The horizontal scale of the chart represents frequency and the vertical scale represents the relative time at which the recordings were performed. On each line of the chart, the magnitude of each number printed thereon represents the maximum amplitude of the largest sample of the particular signal. The color of the number indicates whether the received signal was subject to distortion which may adversely affect the communication between the transmitting and receiving stations if the frequency of the particular signal is chosen as the frequency of the radio signals to be used. Each line represents a series of signals transmitted at a given time, each signal having been transmitted at a different frequency. On the other hand, each column represents signals of the same frequency transmitted at different times.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2, 3:
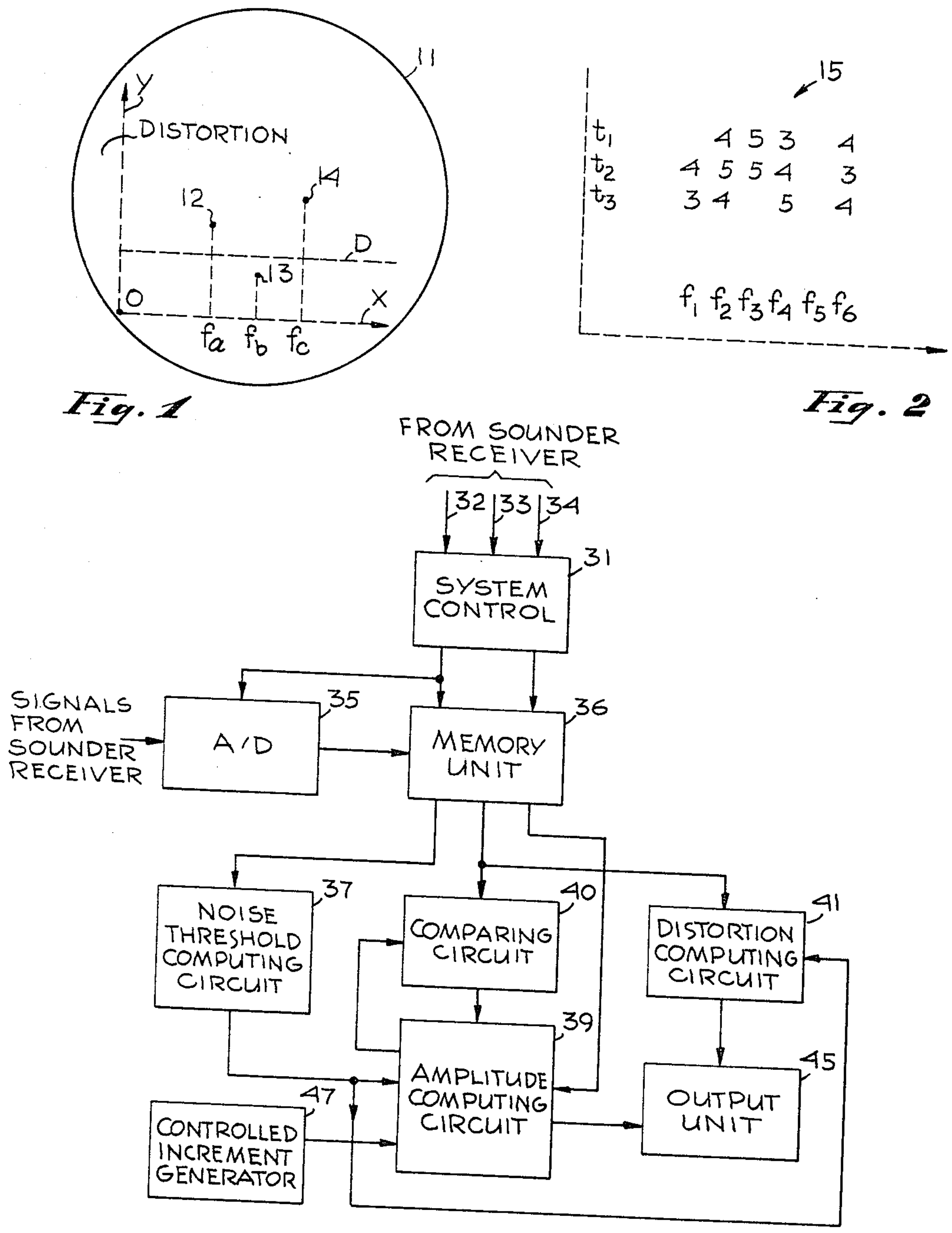
FIGURE 1 is a front view of a conventional electrostatic storage type cathode ray tube, useful in explaining the presentation of data by prior art sounder systems.
FIGURE 2 is a chart displaying data according to the novel teachings of the present invention.
FIGURE 3 is a general block diagram of the data display system of the present invention.

Referring to FIGURE 1 which is a front view of an electrostatic storage type cathode ray tube generally used for data display by presently known systems, there is shown a display surface 11 of the tube. Thereon, the electron beam, which is a part of the cathode ray tube, produces a visual point, the relation of which with respect to a point of origin O represents the characteristics of the signal received by the sounder receiver. In FIGURE 1, the horizontal axis X represents frequency whereas the vertical axis Y represents signal distortion, the dashed line designated D representing a threshold distortion level. Thus the X coordinates of points 12, 13 and 14 represent frequencies *fa*, *fb* and *fc* respectively, of the three received signals. The distortion of each signal is represented by the Y coordinate with respect to the threshold distortion level D. The signal represented by point 13, being below the level D, has a distortion level less than the threshold distortion level, thereby implying that difficulty will not be encountered if *fb* were chosen for radio communications. On the other hand, points 12 and 14 being above the level D imply that frequencies *fa* and *fc*, due to signal distortion, should not be chosen.

The intensity of the points 12, 13 and 14 generally represents the amplitude of the received signals. The incoming signal's amplitude must be above the threshold level of the cathode ray tube to leave a visible record at all. However, even if a visible record is produced, the relative amplitudes between the received signals can only be determined by observing the relative intensities of the points. The record produced on the display surface 11 of the cathode ray display tube is usually of short life, starting to fade after a minute or so. Thus, if permanent records are desired for further study and analysis, additional equipment is necessary to photograph the displays.

Reference is now made to FIGURE 2 which is a chart displaying data in accordance with the teachings of the present invention. As seen therein, a chart 15 comprises a plurality of numbers arranged in rows and columns. Each number represents the magnitude of the signal received by the sound receiver. The numbers in the columns represent signals received frequencies $f_1$ through $f_6$. The numbers in each row represent the signals received during a particular time of day. For example, the numbers in the top row represent signals of frequencies $f_2$, $f_3$, $f_4$, and $f_6$ received at time of day $t_1$. As seen from the chart, at time $f_1$, the sounder receiver did not receive any signals at frequencies $f_1$ and $f_5$, since the positions on the top row corresponding to such frequencies are void of any numerical presentation. Similarly, in the second row, representing the magnitude of signals received at time of day $t_2$, the void in the position related to a frequency $f_5$ indicates the absence of a received signal. At time of day $t_3$, the numbers 3, 4, 5 and 4 represent the magnitudes of signals of frequencies $f_1$, $f_2$, $f_4$, and $f_6$ respectively.

It is thus seen that the chart 15 (FIGURE 2) presents the magnitudes of all the signals received at any particular time of day. The frequency of each signal is determined by the column in the chart in which the number appears, and the time of reception being indicated by its corresponding row. In addition, each signal received is analyzed for distortion characteristics. Whenever such characteristics exceed a predetermined threshold distortion level, thereby implying that difficulty will be encountered if communication is conducted on the particular frequency in question, the number representing the magnitude of the signal of the particular frequency is typed in a different color. Thus, the numbers of the chart 15 are typed in two colors. Those typed in black indicate that the received signals were below the threshold distortion level, thereby implying that difficulty will not be encountered if communications were conducted with such frequencies. On the other hand, the numbers representing the magnitude of signals, the distortion characteristics of which exceed the threshold distortion level, are automatically typed out in red thereby indicating that such frequencies should not be used for radio communication purposes.

Reference is now made to FIGURE 3 which is a block diagram of the display system of the present invention. As seen therein, the system comprises a system control 31 which is connected by means of input lines 32, 33 and 34 to a conventional sounder receiver. In one actual reduction to practice, the sounder receiver samples each signal transmitted at a different frequency by the sounder transmitter, at a rate of ten samples per millisecond (ms.). The recording cycle is initiated by a pulse via input line 32 from the sounder receiver to the system control 31, indicating that the sequence of soundings samples of a particular signal is about to be received. About two milliseconds prior to receiving the actual signal, a second pulse is supplied via input line 33 to the system control 31. As a result, the system control initiates a memory load cycle during which samples received from the sounder receiver are supplied through an analog-to-digital (A/D) converter 35 to be stored in a memory unit 36. Thus, during the first two milliseconds prior to receiving samples of the actual signal, twenty noise samples are stored in the memory unit 36. Thereafter, during the next 13 milliseconds, 130 samples of the actual signal, as sampled by the conventional sounder receiver are stored in the memory unit 36 of the display system of the present invention. The memory unit 36 has a memory capacity of at least 150 8-bit words, so that each sample is stored in another 8-bit word.

At the ned of the 15 millisecond period, the sounder receiver, via input line 34, energizes the system control 31, thereby signifying that the sampling of the particular signal has been completed. As a result, a memory unload cycle is initiated, during which the number representing the maximum magnitude of any of the samples of the particular signal is to be computed and printed. Also, a threshold noise level and distortion data are computed to determine the distortion characteristics, if any, of the received signal. During the memory unload cycle, the memory unit 36 supplies the samples stored in the first twenty words stored therein to a noise threshold computing circuit 37, wherein a noise threshold level is computed in a manner to be hereinafter described. The samples in the other 130 words stored in the memory unit 36 are supplied to an amplitude computing circuit 39 through a comparing circuit 40, and to a distortion computing circuit 41.

In the noise threshold computing circuit 37, the samples from the first sixteen words of the memory unit 36 are added up and then divided to provide an average noise signal. The average noise signal, then, represents an average noise level produced by the first sixteen samplings of the noise preceding the arrival of the samples representing the actual signal transmitted at a particular frequency. The average noise signal is then controllably multiplied by either 2, 3, or 4 depending on the value selected by an operator, to provide a controllable threshold noise signal which is stored in a register within the threshold computing circuit 37. The controllable threshold noise signal is subsequently used in the amplitude computing circuit 39 and the distortion computing circuit 41 to which the noise threshold computing circuit is connected.

As previously stated, the samples stored in the memory unit 36 which represent the actual signal transmitted at a particular frequency are supplied to the amplitude computing circuit 39 through a comparing circuit 40. The first sample representing the actual signal is supplied from the memory unit 36 and is temporarily stored in a register within the amplitude computing circuit 39, the sample being supplied through the comparing circuit 40. Thereafter, every sample supplied from the memory unit 36 is compared with the sample stored in the register within the amplitude computing circuit 39. If the succeeding sample is of an amplitude greater than the sample stored in the register, the comparing circuit 40 produces an output signal thereby replacing the sample stored in the register with the sample of greater amplitude supplied from the memory unit 36. Thus, after all the 130 samples of the signal received at a particular frequency are compared by the comparing circuit 40, the sample of the largest or greatest amplitude is stored in the register of the amplitude computing circuit 39.

Thereafter, the largest sample is compared with the controllable threshold noise signal supplied from the register of the noise threshold computing circuit 37. If the largest sample stored in the register of the amplitude computing circuit 39 is smaller than the controllable threshold noise signal from the noise threshold computing circuit 37, the amplitude computing circuit energizes an output unit 45 to produce a void or empty space on the chart 15 (FIGURE 2). Thus, a void indicates that none of the 130 samples of a particular signal is greater than the computed controllable threshold noise signal produced by the threshold computing circuit 37. If however, the largest sample stored in the amplitude computing circuit 39 is greater than the controllable threshold noise signal produced by the noise threshold computing circuit 37, the controllable threshold noise signal is added to an increment signal supplied to the amplitude computing circuit 39 from a controlled increment generator 47.

The sample stored in the amplitude computing circuit 39 is then compared to the sum of the controllable threshold noise signal supplied from the noise threshold computing circuit 37 and the increment signal supplied by the controlled increment generator 47. If this stored signal is smaller than the sum of the two signals, a number 1 (one) is printed out by the output unit 45. However, if the stored signal in the amplitude computing circuit 39 is still greater than the sum of one increment signal from the controlled increment generator 47 and the controllable threshold noise signal, two increment signals are added to the multiplied threshold level and compared with the stored signal.

The comparing process continues until a sufficient number of increment signals are added to the controllable threshold noise signal, so that the sum is greater than the amplitude of the sample stored in the amplitude computing circuit 39. The number of increment signals required to be added to the controllable threshold noise signal in order to exceed the amplitude of the sample stored in the amplitude computing circuit 39 is the one printed out by the output unit 45. Accordingly, the magnitude of the number printed represents the maximum amplitude of any of the samples of the particular signal received by the sounder receiver. The output unit 45 may comprise a typewriter similar to those used in computer output stages.

In addition to printing out a number representing the maximum amplitude of any of the samples of a particular signal, the distortion characteristics of the signal are also analyzed by the data display system of the present invention. This is accomplished by the distortion computing circuit 49 which like the amplitude computing circuit 39, is supplied with the 130 samples representing the particular signal under analysis. The amplitude of each received signal is compared with the controllable threshold noise signal from the noise threshold computing circuit 37. The first sample having an amplitude greater than the amplitude of the controllable threshold noise signal, starts a counting cycle within the distortion computing circuit 41. The counting cycle is manually controlled so that at the end thereof, a determination may be made whether any of the samples still to be supplied by the memory unit 36 is of an amplitude which is greater than the controllable threshold noise signal. If, after the end of the counting cycle, none of the samples in the memory unit 36 has an amplitude greater than the controllable threshold noise signal, the number printed out by the output unit is printed in black, thereby indicating that the received signal was not distorted and therefore communication problems will not arise due to distortion if the frequency of such a signal is selected for radio communication purposes. If, however, after the end of the counting cycle, a sample is supplied by the memory unit 36 to the distortion computing circuit 41, and the amplitude of such sample is greater than the controllable threshold noise signal, the distortion computing circuit 41 energizes the output unit 45 so that the number to be printed thereby is printed in red. The red color of any of the numbers printed on the chart (FIGURE 2), thus indicates that the signal has been distorted beyond a predetermined distortion level, and that if the frequency of the particular signal were used for radio communication purposes, distortion problems and therefore communication problems, may arise.

Figure 4:
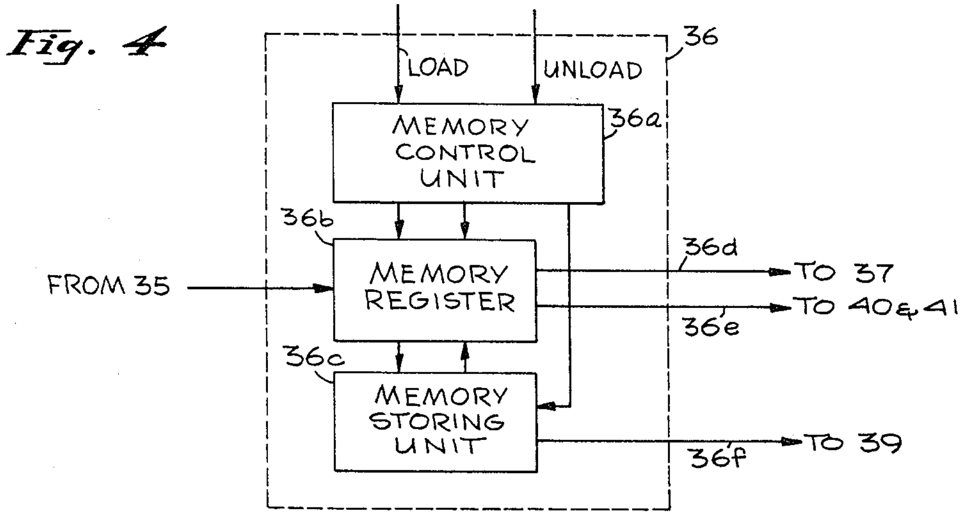
FIGURE 4 is a simplified block diagram of the memory unit shown in FIGURE 3.

Reference is now made to FIGURE 4 which is a block diagram of the memory unit 36 shown in FIGURE 3. As seen, the memory unit 36 comprises a memory control unit 36*a* which is connected to the system control 31 by means of two input lines designated "load" and "unload" respectively. When the memory control unit 36*a* is energized by a pulse from the system control 31 supplied via the load input line, the memory control unit energizes a memory register 36*b* so that samples supplied from the A/D converter 35 are stored through the register in a memory storing unit 36*c*.

At the end of the storing cycle, namely, after the system control 31 (FIGURE 3) is pulsed by the conventional sounder receiver indicating that all the samples of a particular signal have been received, the system control 31 energizes the memory control unit 36*a* via the unload input line, so as to initiate the memory unload cycle hereinbefore referred to. As a result, the memory control unit 36*a* energizes both the memory register 36*b* and the memory storing unit 36*c* so that all the information representing the 150 samples stored in the memory storing unit 36 is supplied through the memory register 36*b* to the noise threshold computing circuit 37, the comparing circuit 40 and distortion computing circuit 41.

The memory register 36*b* is operated so that the samples stored in the first twenty words are supplied to the noise threshold computing circuit 37 via an output line 36*d*, whereas, the rest of the samples stored in the rest of the words of the memory storing unit 36*c* are supplied through the memory register 36*b* via an output line 36*e*. In addition, at the end of the memory unload cycle, namely, after the samples representing all the data stored in the memory storing unit 36*c* have been supplied, the unit energizes via an output line 36*f* the amplitude computing circuits 39, so that the relative maximum magnitude of the largest sample stored therein may be computed with respect to the increment signal which is supplied thereto from the controlled increment generator 47.

Figure 5:
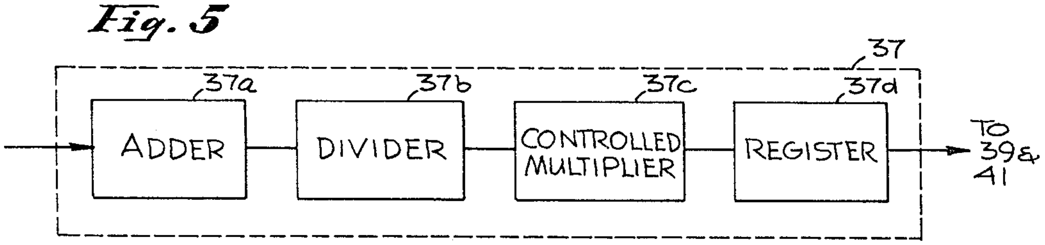
FIGURE 5 is a block diagram of the threshold computing circuit shown in FIGURE 3.

The operation of the noise threshold circuit 37 may best be explained in conjunction with FIGURE 5 which is a block diagram thereof, and to which reference is made herein. In one actual reduction to practice of the system disclosed herein, the noise threshold computing circuit 37 included an adder circuit 37*a* which was operated to add the samples stored in the first sixteen words in the memory storing unit 36*c*. As previously explained, the samples stored in the first twenty words in the memory unit 36 represent noise, since these samples were received by the sounder receiver during a time period which preceded the sampling of the actual signal transmitted at a particular frequency. The sum of all the sixteen samples added in the adder 37*a* is then divided in a divider circuit 37*b*, the output of which represents an average amplitude of the first sixteen noise samples stored in the memory unit 36. The average noise signal from the divider 37*b* is then supplied to a controlled multiplier 37*c* of the noise threshold computing circuit 37.

Since the average noise signal may be, and often is, quite low, it is necessary to multiply such average noise signal in order to produce a meaningful noise threshold level which can be used for comparison purposes in a manner hereinbefore described. The controlled multiplier is set by an operator to multiply the average noise signal from the divider 37*b* by 2, 3, or 4. However, once the multiplication factor is determined and manually set, it need not be changed for the entire series of recordings. The output of the controlled multiplier, which hereinafter is referred to as the controllable threshold noise signal, is supplied to, and temporarily stored in, a register 37*d*. The output of the register 37*d* is connected to the amplitude computing circuit 39, as well as the distortion computing circuit 41, in order to supply the controllable threshold noise signal to the two circuits for comparing it with the samples representing the actual signal transmitted at a particular frequency.

Figure 6:
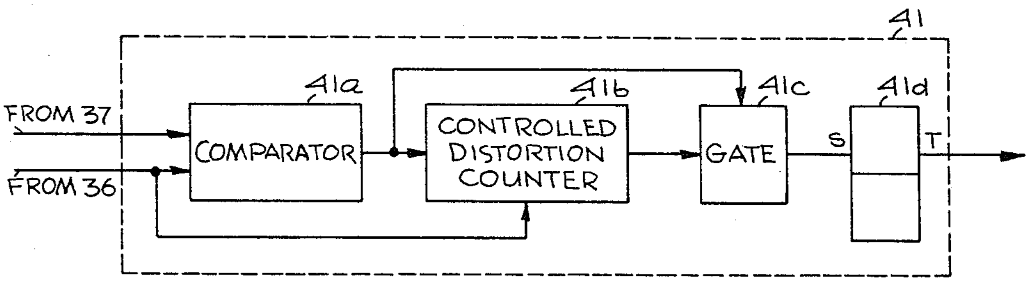
FIGURE 6 is a block diagram of the distortion computing circuit shown in FIGURE 3.

Reference is now made to FIGURE 6 which is a block diagram of the distortion circuit 41. As previously explained, the distortion computing circuit 41 energizes the output unit 45 to print out the number representing the maximum magnitude of any signal in a particular color, depending on whether the particular signal has been distorted about a preselected distortion level. As seen from FIGURE 6, the distortion computing circuit 41 comprises a comparator 41*a* which is supplied with the controllable threshold noise signal from the threshold computing circuit 37, as well as the samples stored in the memory unit 36. The distortion computing circuit 41 also comprises a controlled distortion counter 41*b* and a gate 41*c*. Initially, the gate 41*c* is closed so that signals cannot pass therethrough to set a flip-flop 41*d*. Similarly, the control distortion counter 41*b* is disabled from counting the samples supplied thereto from the memory unit 36. However, as soon as the amplitude of any of the samples supplied from the memory unit 36 exceeds the controllable threshold noise signal, the comparator 41*a* produces an output signal which enables the controlled distortion counter 41*b* to count the samples supplied from the unit 36. As previously explained, the samples are stored in the memory unit 36 at a rate of ten samples per second. Thus, the count of the samples from the memory unit by the controlled distortion counter 41*b* may represent time periods. For example, a count of thirty in the controlled distortion counter 41*b* represents three milliseconds, since the samples supplied thereto from the memory unit 36 were stored at a rate of ten samples per millisecond.

When the control distortion counter 41*b* is set to count up to thirty, the system is adjusted to look for the distortion of the original signal three milliseconds after the reception of the leading edge thereof. The leading edge of the signal is the first sample, the amplitude of which is greater than the controllable threshold noise signal. Such a leading edge enables, through the comparator 41*a*, the counter 41*b* to count the samples which were stored at a rate of ten per millisecond. After three milliseconds, the count in counter 41*b* reaches thirty. At such time, the gate 41*c* is enabled, so that if thereafter the amplitude of any of the samples from the memory unit 36 exceeds the controllable threshold noise signal, the comparator 41*a* provides an output signal. Such output signal passes through the gate 41*c* to set the flip-flop 41*d*. Setting of flip-flop 41*d* results in a true output signal thereof which causes the output unit 45 to print the number therein in red. If however, after three milliseconds from the leading edge of the signal, the amplitude of none of the samples is greater than the controllable threshold noise signal, the flip-flop 41*d* is not set even though gate 41*c* has been enabled by the counter 41*b*. Consequently, the flip-flop 41*d* provides a false output, thereby causing the print out unit 45 to print out the number in black.

The counter 41*b* is controlled so that the distortion of the particular signal being examined may be determined after a number of milliseconds varying anywhere from one to ten after its leading edge has been received. Namely, the counter 41*b* may be adjusted to enable gate 41*c* after counting any desired number of samples anywhere from ten to one hundred. In order to minimize the possibility of noise producing a red shift which indicates signal distortion, the gate counter 41*b* may enable the gate 41*c* for only a preselected interval during which the presence of distortion is examined. In one actual reduction to practice, the interval examined for the presence of distortion was limited to a half a millisecond. Thus, in the foregoing example, where distortion is examined after three milliseconds of the leading edge of the signal under investigation, the counter 41*b* enables the gate 41*c* after accumulating a count of thirty therein, and once a count of thirty-five is reached therein, the gate 41*c* is disabled.

From the foregoing description, it is seen that the data display system disclosed herein is supplied with samples of a signal as received by a conventional sounder receiver. The received samples after being stored within the system, are unloaded in a particular manner which enables the system to automatically compute an average noise signal, which after being multiplied by a desired multiplication factor, results in a useful controllable threshold noise signal. Such a signal is used in a distortion computing circuit in which each sample of the particular signal is compared to detect the leading edge of the signal as well as provide any distortion characteristics of the signal. The automatically produced controllable threshold noise signal is also used, together with an increment signal, in an amplitude computing circuit, wherein it is compared with the largest sample of the particular signal which has been stored in the memory unit 36.

The increment signal, as previously stated, is supplied from a control increment generator 47. In one reduction to practice, the total input range available from the sounder receiver was divided in the generator 47 into 64 equal parts. The generator 47 was provided with a front panel control so that the increment signal therefrom to the amplitude computer circuit 39 may be manually controlled to be equal to *n* times 64ths of the total range from the sounder receiver, *n* representing the number indicated on the front panel control. For example, if a number four is indicated on the front panel control, 4/64 of the total input range of the sounder receiver is supplied to the amplitude computing circuit 39 as the increment signal. Therein, as previously explained, the largest sample stored is compared with the controllable threshold noise signal from the circuit 37. If the largest sample is greater than the controllable threshold noise signal, a signal increment signal is added to the noise signal. The summed signals are again compared with the largest sample until the number of increment signals added to the noise signal is sufficient to exceed the value of the largest sample stored. The number of increment signals necessary to be added to the noise signal is the number printed out by the output unit 45 in response to an output signal from the amplitude computing circuit 39.

Once the output signals from the amplitude computing circuit 39 and the distortion computing circuit 41 are supplied to the output unit 45, it prints the number supplied by the circuit 39 in a color code determined by the signal from the circuit 41. Thereafter, the system shown in FIGURE 3 is reset to its initial state, until another pulse is supplied by the sounder receiver to the system control 31 via the input line 32, thereby indicating that samples from a second signal transmitted to the sounder receiver at a second different frequency is about to be received.

There has accordingly been described and shown herein a novel display system for presenting the characteristics of signals transmitted and received in radio communication sounding systems. The data is generally displayed in chart form on which numbers are printed out. The magnitude of each number represents the relative maximum amplitude of a received signal, and the color of the number provides distortion characteristics of the signal.

In the foregoing description, specific examples have been used to explain the teachings of the invention. However, it is apparent to those familiar with the art that modifications may be made in the arrangements as shown without departing from the spirit of the invention. Similarly, changes may be made in the number of samples used as well as in the manner of their use in deriving the desired information according to the teachings disclosed hereinbefore. Therefore, all such modifications and equivalents are intended to fall within the scope of the invention as claimed.

What is claimed is:

1. In a radio communication sounding system wherein there is transmitted to a receiver an input signal at a selected frequency which is detected by said receiver by receiving a plurality of input samples thereof, said receiver during a preselected time period prior to detecting the input signal is operated to receive a group of noise samples representing atmospheric noise, said receiver further including means for generating control signals, an arrangement for displaying magnitude and distortion characteristics of said input signal comprising means including storing means responsive to control signals from said receiver for storing said group of noise samples and said plurality of input samples received by said receiver; means responsive to said group of noise samples in said storing means for generating a controllable threshold noise signal; means responsive to said plurality of input samples in said storing means and said controllable threshold noise signal for providing a first output signal which is a function of the difference between the amplitude of the largest of said plurality of input samples and the amplitude of said controllable threshold noise signal; means responsive to said controllable threshold noise signal and said plurality of input samples for deriving a second output signal the level of which is a function of a preselected time period between input samples with amplitudes which exceed the amplitude of said controllable threshold noise signal, said second output signal being indicative of the distortion characteristics of said input signal; and output means responsive to said first and second output signals for recording the amplitude characteristics of said input signal as represented by said first output signal, and for further recording the distortion characteristics of said input signal as a function of the level of said second output signal.

2. In a radio communication sounding system wherein an input signal is transmitted at a selected frequency to a sounder receiver wherein it is detected by successively receiving a plurality of input samples thereof, said sounder receiver during a preselected time period prior to detecting the input signal is operated to receive sucessively a group of noise samples representing atmospheric noise, said sounder receiver further including means for generating control signals, an arrangement for displaying magnitude and distortion characteristics of said input signal comprising storing means responsive to control signals from said sounder receiver for storing said group of noise samples and said plurality of input samples successively received by said sounder receiver; means responsive to at least some of the samples of said group of noise samples stored in said storing means for providing a controllable threshold noise signal; means responsive to said plurality of input samples and said controllable threshold noise signal for providing a first output signal which is a function of the difference between the amplitude of the largest of said plurality of input samples and at least the amplitude of said controllable threshold noise signal; means responsive to said controllable threshold noise signal and said plurality of input samples for deriving a second output signal indicative of the distortion characteristics of said input signal; and output means responsive to said first output signal for printing out a number, the magnitude of said number being related to at least the difference between the amplitude of the largest of said plurality of samples of said input signal, and the amplitude of said noise signal, said output means being further responsive to said second output signal for coding said number being printed out so as to indicate the distortion characteristics of said input signal.

3. In a radio communication sounding system as recited in claim 2 wherein said means for deriving a second output signal comprises first comparing means for comparing each sample of said plurality of samples with said controllable threshold noise signal to provide a comparison signal when the amplitude of an input sample of said plurality of input samples is greater than the amplitude of said controllable threshold noise signal; timing signal generating means responsive to a first comparison signal from said comparing means for providing a timing signal at a controllable time period after said first comparison signal; and distortion computing means responsive to said timing signal and said comparing means for providing said second output signal of a first level whenever after the end of said controllable time period said comparing means provides a comparison signal, said second output signal being of a second level whenever after the end of said controllable time period, the amplitude of none of the input samples from said storing means is greater than said controllable threshold noise signal, indicated by the absence of a comparison signal after said time period, said first level of said second output signal indicating a distortion of said input signal beyond a predetermined level as controlled by said controllable time period.

4. In a radio communication sounding system as recited in claim 3 wherein the number printed out by said output means is coded by said second output signal by being printed out in either a first or a second color whenever said second output signal is at said first or said second level respectively.

5. In a radio communication sounding system as recited in claim 2 wherein said means for providing said controllable threshold noise signal includes means for combining at least some noise samples of said group of noise samples to provide an average noise signal having an amplitude which is an average of the amplitudes of the combined noise samples; and controllable multiplying means for controllably multiplying said average noise signal to provide said controllable threshold noise signal.

6. In a radio communication sounding system as recited in claim 2 wherein said arrangement further includes controlled increment generating means for providing an increment signal as a function of the maximum possible magnitude of any sample which may be provided by said sounder receiver, said means for providing said first output signal being further responsive to said increment signal so as to provide said first output signal which is a function of the difference between the amplitude of the largest sample of said plurality of input samples and the amplitudes of both said increment signal and said controllable threshold noise signal.

7. In a sounder receiving system wherein a plurality of input samples of an input signal transmitted at a particular frequency are received in succession and wherein a group of noise samples are received in succession prior to receiving said plurality of input samples, for analyzing the magnitude and distortion characteristics of said input signal, an arrangement comprising means for successively storing said group of noise samples and said plurality of input samples received by said sounder receiving system; means responsive to said group of noise samples in said means for storing for deriving a threshold noise signal; means responsive to said plurality of input samples in said means for storing and said threshold noise signal for providing a first output signal indicative of the magnitude of the largest sample in said plurality of input samples with respect to at least said threshold noise signal; means responsive to said plurality of input samples and said threshold noise signal for providing a second output signal which is a function of an input sample in said storing means whose amplitude exceeds the amplitude of said threshold noise signal, which has been received a preselected time period prior to a preceding input sample with an amplitude greater than the amplitude of said threshold noise signal; and output means responsive to said first and second output signals for printing out a number, the magnitude of said number being related to said first output signal, and the color of said printed out number being a function of the level of said second output signal which is indicative of the distortion characteristics of said input signal.

8. In a radio communication sounding system wherein a series of input signals are successively transmitted by a sounder transmitter during a first time period, each input signal within the series being transmitted at a different frequency and detected by a sounder receiver wherein a plurality of input samples of each input signal are received in succession, said sounder receiver during a predetermined time period prior to receiving a plurality of input samples of each input signal being operated to receive in succession a group of noise samples of noise present in the atmosphere prior to the reception of each plurality of input samples, said sounder receiver including means for generating first and second control signals, an arrangement for displaying magnitude and distortion characteristics of each of said input signals comprising: first means including storing means responsive to said first control signal from said sounder receiver for storing a group of noise samples received by said sounder receiver and for storing the plurality of input samples of one of said input signals which have been received immediately succeeding said stored group of noise samples, said first means including storing means being further responsive to said second control signal to provide the samples stored therein prior to storing a second group of noise samples and a second plurality of input samples of a second input signal; signal generating means responsive to each plurality of input samples and the group of noise samples stored in said storing means therebefore for determining the amplitude of the largest input sample of said plurality of input samples and deriving a controllable threshold noise signal respectively; amplitude computing means responsive to the amplitude of the largest input sample and said controllable threshold noise signal for providing a first output signal which is a function of the difference between the amplitude of the largest input sample of said plurality of samples and at least the amplitude of said controllable threshold noise signal; distortion computing means responsive to each plurality of input samples and the controllable threshold noise signal for deriving a second output signal which is indicative of distortion characteristic of the input signal corresponding to said plurality of input samples the level of said second output signal being a function of the occurrence of an input sample whose amplitude exceeds the amplitude of said noise signal a controllable interval after the occurrence of a first input sample with an amplitude greater than the amplitude of said noise signal; and output means responsive to said first output signal for printing out a number, the magnitude of said number being related to said first ouput signal said ouput means being further responsive to said second output signal for controlling the coding of said printed out number as a function of the level of said second output signal, each coded number representing the characteristics of another one of said group of input signals, the numbers representing the series of input signals successively transmitted during said first time period being arranged in a straight line.

9. In a radio communication sounding system as recited in claim 8 wherein said distortion computing means for deriving a second output signal comprises first comparing means for comparing each input sample of said plurality of input samples with said controllable threshold noise signal to provide a comparison signal when the amplitude of the input sample is greater than the amplitude of said controllable threshold noise signal; timing signal generating means responsive to a first comparison signal from said comparing means for providing a timing signal at a controllable time period after said first comparison signal; and means responsive to said timing signal and said comparing means for providing said second output signal of a first level whenever after the end of said controllable time period represented by said timing signal the amplitude of one of the input samples from said storing means is greater than the amplitude of said controllable threshold noise signal, represented by a comparison signal from said comparing means, said second output signal having a second level whenever after the end of said controllable time period, the amplitude of none of the input samples from said storing means is greater than the amplitude of said controllable threshold noise signal, said first level of said second output signal indicating a distortion of said input signal beyond a predetermined level as controlled by said controllable time period.

10. In a radio communication sounding system as recited in claim 9 wherein the number printed out by said output means is coded by said second output signal by being printed out in either a first or a second color whenever said second output signal is at said first or said second level respectively.

11. In a radio communication sounding system as recited in claim 8 wherein said signal generating means comprises means for combining at least some noise samples of said group of noise samples to provide an average noise signal having an amplitude which is an average of the amplitudes of the combined noise samples; and controllable multiplying means for controllably multiplying said average noise signal to provide said controllable threshold noise signal.

12. In a radio communication sounding system as recited in claim 8 wherein said arrangement further includes controlled increment generating means for providing an increment signal as a function of the maximum possible magnitude of any input sample which may be provided by said sounder receiver, said means for providing said first output signal being further responsive to said increment signal to provide said first output signal which is a function of the difference between the amplitude of the largest input sample of said plurality of input samples and both said increment signal and said controllable threshold noise signal.

13. In a radio communication sounding system wherein an input signal, transmitted to a sounder receiver, is received as a succession of input samples, with a group of noise samples being received prior to said input samples, an arrangement for recording the amplitude characteristic of said input signal comprising:

storing means for storing said noise samples and said input samples;

noise signal generating means responsive to at least some of the noise samples in said storing means to provide a threshold noise signal;

means responsive to the input samples in said storing means for selecting the input sample with the largest amplitude;

amplitude signal generating means responsive to at least the amplitude of said threshold noise signal and the amplitude of the largest input sample for providing a first output signal which is a function of the difference between the amplitude of the largest input sample and the amplitude of said threshold noise signal; and recording means for recording said first output signal.

14. The arrangement as recited in claim 13 further including a source of an incremental signal, and means for supplying the incremental signal from said source to said amplitude signal generating means, said amplitude signal generating means providing said first output signal as a number representing a number by which said incremental signal is to be multiplied to exceed the difference between the amplitudes of the largest input sample and said threshold noise signal, said recording means including means for recording the first output signal as a number.

15. The arrangement as recited in claim 13 further including distortion signal generating means which include comparing means responsive to said threshold noise signal and said input samples for providing a comparison signal when the amplitude of an input sample exceeds the amplitude of said threshold noise signal, and output means for providing a second output signal of a first level when said comparing means provide a comparison signal after a preselected interval from a first comparison signal, said output means providing said second output signal of a second level in the absence of a comparison signal from said comparing means after said preselected interval after said first comparison signal, said recording means includes means for recording said second output signal, as a function of the level thereof.

16. The arrangement as recited in claim 15 further including a source of an incremental signal, and means for supplying the incremental signal from said source to said amplitude signal generating means to provide said first output signal as a number representing a number by which said incremental signal is to be multiplied to exceed the difference between the amplitude of the largest input sample and said threshold noise signal, said recording means including means for recording the first output signal as a number.

17. The arrangement as recited in claim 16 wherein said recording means includes means for coding the number representing said first output signal as a function of the level of said second output signal.

18. The arrangement as recited in claim 17 wherein said recording means print out said number in red when said second output signal is of said first level and in black when said second output signal is of said second level.

References Cited

UNITED STATES PATENTS

| | | | |
|---|---|---|---|
| 2,776,365 | 1/1957 | White | 325—311 |
| 2,779,869 | 1/1957 | Gerks | 328—150 |
| 3,243,811 | 3/1966 | Hose | 235—151.3 X |

OTHER REFERENCES

Naismith and White: "An Automatic Ionosphere Recorder for the Range 0.55 to 17 mcs.," in Institute of Electrical Engineer Proceedings (London) vol. 98, part III, No. 51, January 1951, pp. 11–18.

ROBERT L. GRIFFIN, *Primary Examiner.*

B. V. SAFOUREK, *Assistant Examiner.*